June 20, 1939. A. KÉGRESSE 2,163,203
HYDRAULIC SUPPLY OF ROTATING SYSTEMS
Filed May 27, 1937
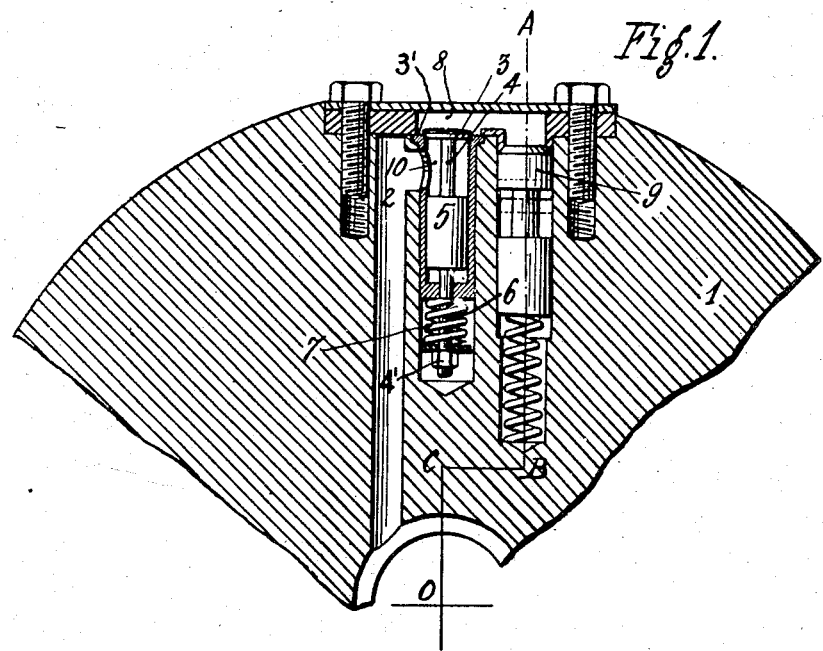
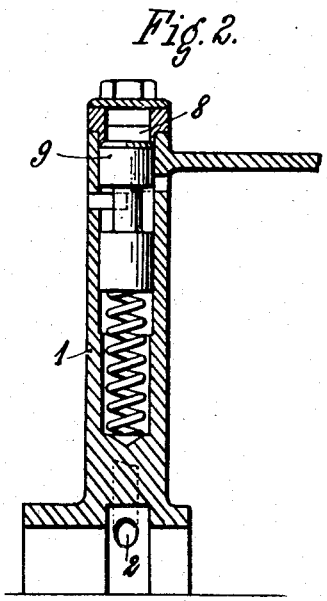
Inventor
ADOLPHE KÉGRESSE
By
Young, Emery & Thompson
Attorneys.

Patented June 20, 1939

2,163,203

UNITED STATES PATENT OFFICE 2,163,203

HYDRAULIC SUPPLY OF ROTATING SYSTEMS

Adolphe Kégresse, Paris, France

Application May 27, 1937, Serial No. 145,141
In France June 6, 1936

4 Claims. (Cl. 137—140)

In hydro-mechanical rotating systems, principally the automatic or controlled speed changers, continuous or in series, where there is used the pressure and the supply of a fluid to obtain desired mechanical effects, it is known that it is indispensable to be able to exactly control the supply of this fluid.

The delivery of the fluid can be easily regulated by hand. To regulate it automatically there are used the variations in speed of the motor, which makes it possible to obtain variations of speed and of output producing the desired mechanical effects, in the case considered, the change of speed.

There has, however, not been obtained in practice the result with variations of pressure and output of effecting the automatic disengagement of all the speeds when the rate of speed of the motor falls to slow speed.

Nevertheless, automatic change of speed can only give entire satisfaction if this latter point is fully carried out.

The difficulties of doing this arise from the fact that on the one hand it is indispensable for the fluid to maintain—in certain cases—a high pressure in slow running, and on the other hand that the viscosity of the fluid, especially when cold, gives even at slow speeds, pressures which are too great and which cannot be made to vary automatically.

It follows from the foregoing that to obtain the automatic disengagement in every case (thick fluid, and high pressure at slow speeds of the motor) it is indispensable to make use of an agent other than the pressure of the delivery of the fluid.

The present invention relates to an improvement made in the distribution of the fluid in rotating members having for their object to automatically cut out the supply of this fluid at a predetermined speed, whatever may be the pressure, the delivery and the viscosity of the fluid used.

Figure 1 shows in sectional elevation one embodiment of the device in question.

Figure 2 is a side view in section on the line A, B, C, O of Figure 1.

In these figures, 1 represents a distributor plate into which the fluid arrives through the centre, to be directed, through the conduit 2, towards a valve of special shape, the head 3 of which rests on a seat 3'. The stem 4 of this valve is of small diameter and merges at the end opposite to the head 3, into a cylindrical part 5 of a diameter approximately equal to the diameter of seat 3'.

This cylindrical part 5 is continued by a rod 6 of small diameter, the extremity of which opposite to the cylinder 5 is threaded to receive a washer and nut 4' serving as an adjustable stop for a valve seating spring 7. The head 3 of the valve controls the flow of fluid into a conduit 8 which is in communication with a valve 9 of known type.

The operation of the device is as follows:

The fluid enters by the conduit 2, penetrates into the chamber 10 and, by its pressure, acts both on the head 3 of the valve as also upon the opposite face formed by the cylindrical part 5. These two sections being approximately the same, it follows that the pressure of the fluid has no influence on the valve, since this pressure is counterbalanced by the two said surfaces. The spring 7 will therefore keep the valve closed whatever may be the viscosity, the pressure or the delivery of the fluid.

If now the system commences to rotate, the centrifugal force of the valve, the cylindrical part 5 of which is of a mass determined once for all, will be added to the centrifugal force of the column of oil. These two forces will overcome the tension of the spring, causing the valve to open and allow the passage of the fluid which will supply in the usual way the distributing valve 9.

The operation of this latter is already disclosed by the patent applications in the United States No. 98,392 of August 28, 1936, for "Automatic and controlled multiple hydraulic coupling, in particular for change-speed gears, applicable to automobiles", and No. 124,308 of February 5, 1937, in the United States for "Disc clutches compressed hydraulically".

As will be seen, the operation of the valve 3—5 will depend solely upon centrifugal force, that is to say, upon the speed of the rotating system. The adjustment of the spring 7 on the one hand, and the weight of the valve on the other hand will make it possible to determine in a precise manner the rate of opening and of closing of the valve, which it has been impossible to obtain with the valve distribution already known.

As will be seen, the operation of the system is absolutely automatic. It will only permit the fluid to operate at the speed strictly desired, for which it has been regulated. It will also permit interruption of the hydraulic action as soon as the speed of the rotating system falls below a predetermined value.

The annexed drawing shows a single distributing system. It is understood that any rotating member may constitute an actual distributor and comprise for example two, three or four similar systems.

It is also possible to contrive a plurality of similar devices on a number of plates mounted either on the same shaft or on different shafts, the number and the arrangement of the rotating systems still remaining within the scope of the invention.

I claim:

1. In a device for the automatic interruption of the supply in rotating hydraulic systems, in which a fluid arrives under pressure from a source, a radial normally closed valve comprising a head and a body of comparatively large diameter, limiting an admission chamber for the fluid, and connected by a rod of reduced section, the body of large diameter of the valve forms a piston, ensuring the guiding of the said valve in the interior of its recess, at the same time that it increases the mass thereof, the piston moving in a lining one of the extremities of which forms the seat of the valve, its other extremity being closed and traversed by an extension of the body of the valve, an adjustable stop provided at the extremity of the said extension, and a valve seating spring positioned between the bottom of the lining and said adjustable stop.

2. In a device for the automatic interruption of the fluid supply in rotating hydraulic systems, in which a fluid arrives under pressure from a source, a balanced normally closed valve of the poppet type radially mounted on said rotating system and presenting to the fluid two opposite surfaces of approximately the same area, and a valve seating spring regulated to overcome the effect of centrifugal force tending to open the valve at a minimum predetermined speed of rotation of the rotating system.

3. In a device for the automatic interruption of the fluid supply in rotating hydraulic systems, in particular applicable to speed changers in automobiles, in which a fluid arrives under pressure from a source, a balanced normally closed valve of the poppet type radially mounted on said rotating system and presenting to the fluid two opposite surfaces of approximately the same area, and a valve seating spring regulated to overcome the effect of centrifugal force tending to open the valve at a minimum predetermined speed of rotation of the rotating system, said spring being arranged closer to the axis of rotation than the valve itself.

4. In a device for the automatic interruption of the fluid supply in rotating hydraulic systems, in which a fluid arrives under pressure from a source, a normally closed valve of the poppet type radially mounted on said rotating system and comprising a head of relatively large diameter and a stem of reduced section provided with a body of relatively large diameter axially spaced from the head and defining a pressure equalizing chamber for the fluid between said head and body controlled by the valve, and a valve seating spring regulated to overcome the effect of centrifugal force tending to open the valve at a minimum predetermined speed of rotation of the rotating system.

ADOLPHE KEGRESSE.